United States Patent [19]

Lockridge et al.

[11] Patent Number: 4,944,878
[45] Date of Patent: Jul. 31, 1990

[54] DECONTAMINATION OF WATER USING NITRATE SELECTIVE ION EXCHANGE RESIN

[75] Inventors: James E. Lockridge; James S. Fritz, both of Ames, Iowa

[73] Assignee: Iowa State University Research Foundation, Inc., Ames, Iowa

[21] Appl. No.: 437,266

[22] Filed: Nov. 16, 1989

[51] Int. Cl.$^5$ ............................................. C02F 1/42
[52] U.S. Cl. ...................................... 210/683; 210/903
[58] Field of Search ............................... 210/683, 903

[56] References Cited

U.S. PATENT DOCUMENTS

| | | | |
|---|---|---|---|
| 3,420,773 | 1/1969 | Selmeczi | 210/28 |
| 3,775,088 | 11/1973 | Higgins | 71/1 |
| 4,061,724 | 12/1977 | Grose et al. | 423/335 |
| 4,134,861 | 1/1979 | Roubinek | 521/32 |
| 4,267,057 | 5/1981 | Hager et al. | 210/678 |
| 4,479,877 | 10/1984 | Guter | 210/670 |
| 4,483,772 | 11/1984 | Rolke et al. | 210/601 |
| 4,642,192 | 2/1987 | Heskett | 210/638 |
| 4,671,879 | 6/1987 | Solt et al. | 210/610 |
| 4,872,989 | 10/1989 | Pirotta | 210/903 |

FOREIGN PATENT DOCUMENTS

| | | |
|---|---|---|
| 3301054 | 7/1984 | Fed. Rep. of Germany . |
| 54-133755 | 10/1979 | Japan . |
| 55-008891 | 7/1980 | Japan . |

OTHER PUBLICATIONS

Chemical Abstracts 103: 124434j (1985).
Guter, "Removal of Nitrate from Contaminated Water Supplies for Public Use: Final Report," EPA-600-S-2-82-042 (Aug. 1982).

*Primary Examiner*—Ivars Cintins
*Attorney, Agent, or Firm*—Zarley, McKee, Thomte, Voorhees & Sease

[57] ABSTRACT

A method for nitrate decontamination of water which involves passing the water through a bed of alkyl phosphonium anion exchange resin which has pendant alkyl groups of $C_3$ or larger.

6 Claims, No Drawings

DECONTAMINATION OF WATER USING NITRATE SELECTIVE ION EXCHANGE RESIN

GRANT REFERENCE

This invention was made with Government support under Contract No. W-7405-ENG82 awarded by the Department of Energy. The Government has certain rights in the invention.

BACKGROUND OF THE INVENTION

It is known that nitrates may be physiologically harmful to humans. Over the years, this problem has become more chronic with the extensive use of nitrate-containing fertilizers. As a result of heavy use of nitrate-containing fertilizers there has been gradual contamination of ground water with nitrates.

It can be seen, therefore, that especially in agricultural areas the presence of nitrate in municipal water supplies has become an ever increasing pollution problem. There is, therefore, a continuing need for effective nitrate removal.

There are two major problems with commercially available anion exchange resins that are used for nitrate removal. If sulfate is present in a nitrate contaminated water, a proportionate amount of resin capacity is consumed by the sulfate. Secondly, unless the process is carefully monitored, the concentration effect for nitrate is observed. This phenomenon occurs as resin capacity becomes exhausted. Influent sulfate will then exchange for the previously removed nitrate, causing nitrate levels in the effluent water to actually rise well above the original nitrate concentration. Hence, in a situation where careful monitoring is impossible, effluent nitrate levels will be unpredictable and often the net removal of nitrate very small. This often occurs with a trimethylammonium resin such as DOWEX-1 ®.

For examples of uses of tributylamine resin, see Guter, U.S. Pat. No. 4,479,877 issued Oct. 30, 1984 and Guter, "Removal of Nitrate From Contaminated Water Supplied for Public Use: Final Report," EPA-600/S2-82-042 of August 1982. The resins described in the Guter patent and EPA publication have some of the problems earlier described herein, namely, reduced capacity and variability of nitrate removal due to sulfate content. This is simply another way of saying that the life of the resin is short and unpredictable with trialkylamine resins. This is illustrated by the examples shown below.

Another problem which exists with use of ion exchange resin techniques for removal of nitrate is that most ground water contains both nitrate and sulfate. Most of the resins used are not highly nitrate selective resins, and in particular will selectively remove sulfate over nitrate. Such renders the resin less useful for nitrate removal. It is therefore desirable to have a resin which is nitrate selective and relatively immune to interfering ions normally present in ground water, such as sulfate. As Guter reports, the presence of significant amounts of dissolved sulfate ion (about 50 ppm or more) has been demonstrated to be an impediment to nitrate removal.

While the Guter technique has involved some ability to selectively remove nitrate with anion exchange resins, the resin has a relatively small selectively coefficient and capacity in comparison with the resins of the present invention, and a shorter life before regeneration is necessary.

It therefore can be seen that there is a real and continuing need for inexpensive anion exchange techniques which can be used with municipal water supplies to selectively remove nitrate from ground water, which may contain anions that are normally regarded as interfering with nitrate removal, such as sulfate. This invention has as its primary objective the fulfilling of this need.

As a result, applicants are able to achieve successful nitrate ion removal, even in high sulfate ion containing water supply. The method and manner of accomplishing each of the above objectives will become apparent from the detailed description of the invention which follows hereinafter.

SUMMARY OF THE INVENTION

This invention relates to trialkylphosphonium anion exchange resins for selective removal of nitrate, even in the presence of interfering ions such as sulfate. The alkyl group is $C_3$ or larger, and preferably $C_3$ to $C_6$. These resins result in nearly 100% of the resins capacity being used for nitrate removal and the concentration effect noted for commercial resins is not observable with the trialkylphosphonium resin.

DETAILED DESCRIPTION OF THE INVENTION

The resins used as substrates to produce the trialkylphosphonium anion exchange resins employed in the method of the present invention are copolymers of vinylaryl compounds and a polyolefinic cross-linking agent. The monovinyl aromatic compounds are suitably vinyl aromatic hydrocarbons, such as styrene, ortho-, meta-, and para-methyl and ethyl styrenes, vinyl naphthalene, vinyl anthracene and the homologues of these compounds. Styrene is preferred. Also, the monovinyl aryl moiety of the copolymer may consist of nuclear substituted chlorine or bromine substituted vinyl aryl compounds, such as the ortho-, meta- and para-chloro and bromo styrenes copolymerized with other diluting monovinyl aryl compounds. The preferred polyolefinic cross-linking agents are polyvinyl aromatic compounds, also selected from the benzene and naphthalene series. Examples of polyvinylaromatic compounds are divinylbenzene, divinlytoluene, divinylxylene, divinylnatphthalene and divinylethylbenzene.

The most preferred resin to use as a starting material is a copolymer of styrene and from about 4% to about 20% by weight of the cross-linking agent, divinylbenzene. This resin is manufactured by Rohm & Haas Co. and the finished anion exchange resin is sold under the trademark AMBERLITE IRA 996 or IRA 900. It may be used as a starting material for the present invention. Other resins which may be used include chloromethylated precursor to DUOLITE A-104, and is available from Diamond Shamrock Co.

The anion exchange resins employed in the present invention may be formed by first reacting one of the aforementioned copolymers with a halogen in the presence of a halogenating catalyst to produce halo-methyl radicals attached to the aromatic nuclei in the resin. Halogenated resin can then be reacted with trialkylphosphonium, for use in the present invention.

The trialkylphosphonium resin is utilized in a conventional manner for treatment of water containing both nitrate and sulfate ions. Standard commercial water softening equipment may be used; however, some modifications may be desirable to improve distribution of the influent flow. The nitrate removal may be by a continuous process or by batch process, as deemed convenient for this system used. Suitable flow rates for influent and for regenerate, for example regenerating sodium chloride, are those conventionally used for other strong based anion exchange resins.

The alkyl groups on the quaternary phosphonium site to date evaluated are $C_1$ to $C_5$. The most promising pendant moieties are $C_3$ to $C_5$ alkyl groups. Generally speaking, the larger the R group (pendant alkyl group) gives higher selectivity but also slightly decreased capacity. $C_3$ to $C_5$ seems to be the most preferred from the data generated so far.

An important property of the trialkyl phosphonium resins of the present invention are that they have a high selectivity coefficient ($K_S^N$). This refers to the resin's preference for nitrate over sulfate. $K_S^N$ is derived from the equilibrium exchange equation between sulfate and nitrate ion, and may be represented as follows:

$$2 \text{ Resin-NO}_3 + SO_4 = \rightleftharpoons \text{Resin}_2SO_4 + 2NO_3^-$$

The selectivity coefficient is defined as:

$$K_S^N = \frac{[\text{Resin-NO}_3]^2 [SO_4^=]}{[\text{Resin}_2SO_4] [NO_3^-]^2}$$

For a nitrate selective resin, it is desirable to have as much resin-$NO_3$ as possible. Therefore $K_S^N$ will get larger as nitrate selectivity increases.

Generally speaking, the selectivity coefficient for the resins of this invention should be from $1.2 \times 10^5$ to $8.4 \times 10^5$. These are significantly higher selectivity coefficients than those achieved by the trialkylamine resins of Guter. This is illustrated in Example 1 below.

The resins used in the method of the present invention, upon reaching the first nitrate breakthrough point may be voluntarily regenerated by washing with a 6% by weight sodium chloride brine. The regeneration is preferably passed through the resin column in the same direction as the water undergoing treatment. How, sodium chloride may be used for the regeneration, other water soluble chloride ion sources may also be used, such as for example ammonium chloride. The following examples are offered to further illustrate but not necessarily limit the process of this invention, and to demonstrate the superiority of the quaternary phosphonium group, in comparison with quaternary amine groups attached to the copolymer.

EXAMPLES

Table I compares the change in $K_S^N$ capacity between a homologous series of trialkylammonium resins and a series of trialkylphosphonium resins of the present invention. In general, as the size of the alkyl chain (R) increases, $K_S^N$ also increases. However, as illustrated in the Table, as the pendant R group increases, there also is a tendency for a decrease in throughput capacity. Thus, the preferred alkyl groups are those of intermediate chain length $C_3$ to $C_5$.

Each of the resins of the present invention were prepared in the following manner. Approximately 1 gram of the commercial chloromethylated resin was mixed with 30 ml of methanol in a 100 ml round bottom flask. A 5-fold excess of t-phosphine was then added to the mixture and the reaction was allowed to proceed at room temperature for seven days. On completion of the reaction period the resin was filtered and washed three times with methanol, then water and acetone and finally air dried. All resins tested were completely exchanged with chloride ion by shaking the resin overnight, with several changes of 2-molar sodium chloride. A column of 0.6 ml of the resin was placed in a small glass tube, 0.54 cm in diameter. Nitrate contaminated tap water consisting of 96 ppm nitrate, and 124 ppm sulfate, and 31 ppm chloride was then pumped through the resin. The water exiting the column (column effluent) was collected in fractions. The fractions are then analyzed for nitrate, sulfate and chloride by ion chromatography. The results of the analyses are reported in the data charts (Tables) below.

EXAMPLE 1

The following Table shows a comparison of the selectivity coefficients and capacities for trialkylamine resin in comparison with the trialkyl phosphine resins of the present invention.

Selectivity coefficients and capacities were measured as earlier described.

TABLE I

| Resin (mEq/g) | Selectivity Coefficient | Capacity |
|---|---|---|
| Trimethylamine | 600 | 3.61 |
| Triethylamine | 9,000 | 2.39 |
| Tributylamine | 102,000 | 1.23 |
| Trimethylphosphine | 2,000 | 2.22 |
| Tripropylphosphine | 120,000 | 1.99 |
| Tributylphosphine | 660,000 | 1.68 |
| Tripentylphosphine | 840,000 | 1.27 |

It can be seen from Table I that the resins of the present invention had extremely high selectivity coefficients in comparison with a trimethylamine resins. This indicates a strong nitrate selective resin in comparison with those commercially available. Furthermore, these resins were able to retain high capacity even as their selectivity coefficients increased. This indicates that not only will the resins retain more ions overall, but that they will do so while "ignoring" the sulfate ion.

EXAMPLES 2, 3 and 4

As shown below for comparison purposes in the Table designated I-A is a commercial Dowex resin. Table I-A shows a nitrate decontamination profile for a commercial Dowex anion-exchange resin. All anions are expressed in ppm. Influent levels were 30 ppm chloride, 96 ppm nitrate, and 128 ppm sulfate.

TABLE I-A

| Bed Volumes | Effluent Levels | | |
|---|---|---|---|
| | Nitrate | Sulfate | Chloride |
| 18 | 0 | 0 | 80 |
| 45 | 0 | 0 | 82 |
| 91 | 0 | 0 | 79 |
| 182 | 0 | 0 | — |
| 273 | 0 | 0 | 75 |
| 309 | 2 | 0 | 77 |
| 364 | 120 | 0 | 50 |
| 409 | 203 | 22 | 32 |
| 455 | 110 | 112 | 34 |
| 500 | 97 | 125 | 31 |
| 546 | 95 | 124 | 35 |
| 593 | 95 | 124 | 41 |
| 637 | 95 | 124 | — |

Tables II, III and IV correspond to runs using tripropylphosphine, tributylphosphine, and tripentylphosphine respectively. As can be seen in Tables II, III and IV, the amount of sulfate retained is insignificant. This results in nearly 100% of the resin's capacity being used for nitrate removal. The concentration effect noted for commercial resin (Table designated 1-A) is not observed for trialkylphosphonium resins. In fact, a slight concentration effect is instead observed for sulfate. The process of nitrate decontamination by trialkylphosphonium resins is not only a highly efficient process, but can be accomplished without the careful monitoring previously required by commercially available resins.

Table II below shows the nitrate decontamination profile for the tripropylphosphonium exchanger. The conditions were as in Table I-A.

TABLE II

| Bed Volumes | Effluent Levels | | |
|---|---|---|---|
| | Nitrate | Sulfate | Chloride |
| 23 | 0 | 1 | 98 |
| 45 | 0 | 12 | 94 |
| 68 | 0 | 44 | 88 |
| 90 | 0 | 77 | 80 |
| 113 | 0 | 99 | 66 |
| 170 | 0 | 125 | 65 |
| 339 | 0 | 145 | 54 |
| 418 | 19 | 146 | 48 |
| 452 | 48 | 140 | 44 |
| 486 | 85 | 134 | 37 |
| 565 | 96 | 127 | 33 |

Table III shows the nitrate decontamination profile for the tributylphosphonium exchanger. The conditions were the same as in Table I-A.

TABLE III

| Bed Volumes | Effluent Levels | | |
|---|---|---|---|
| | Nitrate | Sulfate | Chloride |
| 16 | 0 | 0 | 76 |
| 32 | 0 | 6 | 75 |
| 56 | 0 | 45 | 64 |
| 80 | 0 | 88 | 60 |
| 120 | 0 | 121 | 51 |
| 160 | 0 | 135 | 47 |
| 200 | 0 | 140 | 50 |
| 240 | 0 | 144 | 47 |
| 320 | 0 | 146 | 48 |
| 400 | 0 | 145 | 46 |
| 480 | 27 | 143 | 43 |
| 520 | 56 | 135 | 40 |
| 560 | 83 | 130 | 35 |
| 600 | 94 | 127 | 32 |
| 640 | 96 | 128 | 35 |
| 720 | 96 | 127 | 29 |

Table IV shows the nitrate decontamination for the triphenylphosphonium exchanger. The conditions were the same as in Table I-A.

TABLE IV

| Bed Volumes | Effluent Levels | | |
|---|---|---|---|
| | Nitrate | Sulfate | Chloride |
| 26 | 0 | 5 | 90 |
| 64 | 0 | 67 | 77 |
| 128 | 0 | 128 | 65 |
| 192 | 0 | 141 | 58 |
| 307 | 7 | 143 | 57 |
| 384 | 32 | 141 | 48 |
| 474 | 77 | 132 | 39 |
| 640 | 98 | 129 | 33 |

EXAMPLES 5-8

In Examples 5 and 6, reported in Tables V and VI, respectively, tap water from a local small municipality, George, Iowa, was pumped through the resin. Table V uses tributylphosphonium resin prepared in the manner previously described, and Table VI uses a commercially available nitrate-selectively resin known as IRA 996.

Looking first at Table V and VI, water from George, Iowa which was used in the tests had a nitrate level of 44 ppm, a sulfate level of 84 ppm and a chloride level of 21 ppm.

The town of George, Iowa draws its water from an aquifer which is just over the EPA limit for nitrate in drinking water. The two resins that were compared were tributylphosphonium resin and a commercially available nitrate selective resin, IRA 996. The IRA 996 resin consisted of a triethylammonium group bound to a polystyrenedivinylbenzene resin and is commercially available through Rohm & Haas Company.

Table V is a decontamination profile of the tributylphosphonium exchanger using George, Iowa tap water. It can be seen that a comparison of Table V and Table V that the resin of the present invention was far more effective at reducing nitrate level, and as illustrated in Tables VII and VIII. This was true even when there was added sulfate ion. In Tables VII and VIII added sulfate ion was used to give an increased level of 260 ppm. The effect of this increased sulfate was very pronounced in the 996 resin reducing capacity by about 200 bed volumes but the tributylphosphon-ium resin was not affected by this increased sulfate. It yielded a breakthrough curve identical to the low sulfate water.

Table v shows a nitrate decontamination profile for the tributylphosphonium exchanger of George, Iowa tap water. All anions are expressed in ppm. Influent levels were 21 ppm chloride, 45 ppm nitrate, and 85 ppm sulfate.

TABLE V

| Bed Volumes | Effluent Levels | | |
|---|---|---|---|
| | Nitrate | Sulfate | Chloride |
| 64 | 0 | 22 | 113 |
| 80 | 0 | 36 | 102 |
| 113 | 0 | 55 | 80 |
| 145 | 0 | 69 | 68 |
| 178 | 0 | 78 | 60 |
| 210 | 0 | 83 | 54 |
| 242 | 0 | 84 | 48 |
| 274 | 0 | 89 | 47 |
| 323 | 0 | 93 | 42 |
| 404 | 0 | 90 | 39 |
| 646 | 0 | 91 | 37 |
| 807 | 0 | 93 | 35 |
| 888 | 13 | 89 | 32 |
| 968 | 27 | 87 | 29 |
| 1049 | 43 | 85 | 23 |
| 1130 | 48 | 84 | 22 |
| 1210 | 50 | 82 | 22 |
| 1249 | 48 | 84 | 21 |
| 1291 | 49 | — | 21 |
| 1356 | 48 | — | — |

Table VI shows the nitrate decontamination profile for the IRA 996 nitrate selective anion-exchange resin of George, Iowa tap water. The conditions were the same as in Table V.

TABLE VI

| Bed Volumes | Effluent Levels | | |
|---|---|---|---|
| | Nitrate | Sulfate | Chloride |
| 32 | 0 | 0 | 218 |
| 64 | 0 | 0 | 168 |
| 97 | 0 | 0 | 134 |
| 129 | 0 | 0 | 110 |
| 161 | 0 | 0 | 92 |
| 194 | 0 | 0 | 80 |
| 242 | 0 | 26 | 66 |
| 274 | 0 | 97 | 38 |
| 323 | 0 | 110 | 29 |
| 404 | 0 | 110 | 28 |
| 484 | 0 | 111 | 28 |
| 565 | 0 | 110 | 28 |
| 646 | 25 | 101 | 25 |
| 726 | 51 | 87 | 23 |
| 807 | 51 | 87 | 23 |
| 888 | 51 | 87 | 23 |
| 968 | 52 | 86 | 23 |
| 1049 | 51 | 87 | 22 |
| 1130 | 51 | 85 | 22 |
| 1210 | 51 | 85 | 22 |

Table VII shows the nitrate decontamination profile for the tributylphosphonium exchanger of George, Iowa tap water plus added sulfate ion. The influent levels were 21 ppm chloride, 45 ppm nitrate, and 260 ppm sulfate.

TABLE VII

| Bed Volumes | Effluent Levels | | |
|---|---|---|---|
| | Nitrate | Sulfate | Chloride |
| 64 | 0 | 135 | 200 |
| 80 | 0 | 192 | 150 |
| 113 | 0 | 220 | 122 |
| 145 | 0 | 230 | 99 |
| 178 | 0 | 249 | 78 |
| 210 | 0 | 257 | 64 |
| 242 | 0 | 260 | 55 |
| 274 | 0 | 260 | 48 |
| 323 | 0 | 266 | 43 |
| 404 | 0 | 264 | 40 |
| 646 | 0 | 270 | 38 |
| 807 | 0 | 265 | 33 |
| 888 | 0 | 270 | 32 |
| 968 | 0 | 266 | 30 |
| 1049 | 14 | 265 | 26 |
| 1130 | 23 | 267 | 25 |
| 1210 | 34 | 264 | 22 |
| 1249 | 42 | 260 | 19 |
| 1291 | 46 | 264 | 19 |
| 1356 | 46 | 260 | 19 |

Table VIII shows the nitrate decontamination profile for the IRA 996 nitrate selective anion-exchange resin of George, Iowa tap water plus added sulfate ion. Conditions were the same as in Table VII.

TABLE VIII

| Bed Volumes | Effluent Levels | | |
|---|---|---|---|
| | Nitrate | Sulfate | Chloride |
| 32 | 0 | 0 | 200 |
| 64 | 0 | 21 | 150 |
| 97 | 0 | 205 | 122 |
| 161 | 0 | 271 | 99 |
| 194 | 0 | 271 | 78 |
| 242 | 0 | 271 | 64 |
| 274 | 0 | 271 | 55 |
| 323 | 0 | 271 | 48 |
| 404 | 0 | 271 | 43 |
| 484 | 23 | 266 | 40 |
| 565 | 45 | 260 | 38 |
| 646 | 47 | 260 | 33 |
| 726 | 47 | 260 | 32 |
| 807 | 47 | 260 | 30 |
| 888 | 47 | 260 | 26 |

It therefore can be seen that the invention accomplishes at least all of its stated objectives.

What is claimed is:

1. A method for nitrate decontamination of water, comprising:
   passing water containing nitrate ions through a bed of nitrate selective alkylphosphonium anion exchange resin having pendant alkyl groups of $C_3$ or larger, thereby removing said nitrate ions from the water.

2. The method of claim 1 wherein the anion exchange resin to which said alkylphosphoniums are attached is a copolymer of styrene and from about 4% to 20% by weight of said copolymer of divinylbenzene.

3. The method of claim 2 wherein the alkyl group is from $C_3$ to $C_5$ in length.

4. The method of claim 2 wherein said water contains both nitrate ions and sulfate ions.

5. The method of claim 4 wherein said water contains sulfate ion levels which are higher in ppm than the nitrate levels.

6. The method of claim 1 wherein the selectivity coefficient of the alkylphosphonium anion exchange resin is from about $1.2 \times 10^5$ to about $8.4 \times 10^5$.

* * * * *